J. C. McQUILKIN.
AUTOMOBILE TOP.
APPLICATION FILED MAY 13, 1919.
1,400,890.
Patented Dec. 20, 1921.
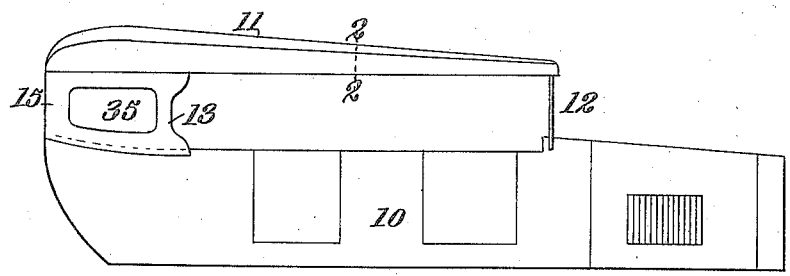
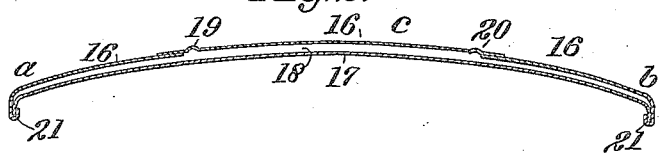
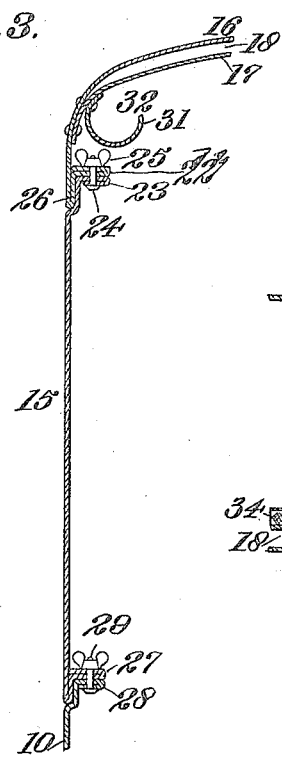
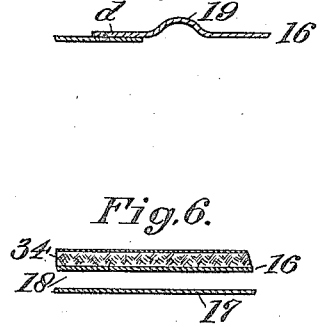
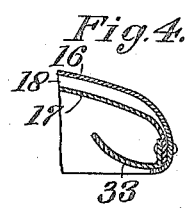
INVENTOR
James C. McQuilkin
BY
Strong & Townsend
ATTORNEYS

UNITED STATES PATENT OFFICE.

JAMES C. McQUILKIN, OF OAKLAND, CALIFORNIA.

AUTOMOBILE-TOP.

1,400,890. Specification of Letters Patent. Patented Dec. 20, 1921.

Application filed May 13, 1919. Serial No. 296,801.

*To all whom it may concern:*

Be it known that I, JAMES C. McQUILKIN, a citizen of the United States, residing at Oakland, in the county of Alameda and State of California, have invented new and useful Improvements in Automobile-Tops, of which the following is a specification.

This invention relates to a vehicle top.

It is the object of the present invention to provide a vehicle top having inherent rigidity without the use of bows or reinforcing members and which is especially adapted for use upon automobiles, it being decidedly simple and economical in its construction, and readily mounted in position.

It is the further object of the present invention to provide a top of the class described, which may be formed with an airspace throughout its length, acting as an insulating barrier against the rays of the sun and to reinforce the structure.

The present invention is particularly concerned with a top formed of material of such a character as to be rigid and self-supporting without the use of a framework and which may be formed with heat insulating spaces and curtain compartments.

The invention is illustrated by way of example in the accompanying drawings in which:

Figure 1 is a view in side elevation, illustrating the application of the top to an automobile body.

Fig. 2 is a view in transverse section as seen through the top on the line 2—2 of Fig. 1, clearly showing the insulating space.

Fig. 3 is an enlarged fragmentary vertical section showing the manner of construction of the back of the top, and its connection with the main top portion.

Fig. 4 is an enlarged fragmentary view showing one of the compartments formed along the front of the top.

Fig. 5 is an enlarged fragmentary view showing the manner in which the top is ribbed and its parts united.

Fig. 6 is a fragmentary view and section.

Referring more particularly to the drawings 10 indicates a vehicle body, upon which is mounted a covering top 11, this top is supported at its forward end by means of front bows 12 or a wind-shield frame and at its rear end by the side wall portion 13 and the rear wall portion 15. These portions 13 and 15 and the top 11 are formed of a rigid material such as sheet metal, papier mâché and the like and thus combine with the front and rear supports to form a rigid and permanent top structure.

The top is formed, as shown in Fig. 2, with an upper or rib roof portion 16 and an under-wall 17. These walls are spaced in relation to each other and thus provide an air-compartment 18 which will act to insulate the top and prevent the direct radiation of heat from the roof portion 16 to the interior of the vehicle. The roof 16 is here shown as made of three parts. Opposite and parallel side parts —*a*— and —*b*— and a central portion *c*. The three parts are arranged in overlapping relation to each other and are then spot-welded as indicated at —*d*— in Fig. 5. In order that the roof section of the top will be thoroughly reinforced it is formed with longitudinally extending protrusions 19 and 20 which in reality are ribs extending the length of the top. These ribs will act to stiffen the top and will tend to hold it in its normal position irrespective of the stiff portion strains which will be imparted thereto as the frame of the vehicle is twisted.

The outer edges of the top portion 16 and 17 are turned downwardly and the edges of the portion 16 are formed with grooves 21. These grooves receive the outer down-turned edges of the top member 17 as shown in Fig. 2.

The sides of the roof section and the lower wall are thus secured together. The ends, however, are formed in a slightly different manner, as shown in Figs. 3 and 4. The rear end of the top portion extends downwardly and over the rear edge of the wall portion 17 and is then bent upwardly and inwardly to form a horizontally extending ledge 22. This ledge is adapted to rest upon a similar ledge 23 formed as a part of the back wall 15. When in position the two ledges are fastened together by means of bolts 24 fitted with suitable nuts, as the wing nuts indicated at 25 in Fig. 3. The upper portion of the wall 15 is formed with a recess 26 which receives the downwardly extending edge of the top and insures that the rear of the top and the wall portion 15 will be in alinement and will thus be sightly in its appearance. The lower end of the wall portion 15 is formed with a similar reinforced ledge 27 which rests upon a ledge 28 of the vehicle body and is there secured by means of bolt 29. The forward edge of the top is formed as shown in Fig. 4 where it will be seen that the upper section 16 of the top is bent downwardly and over and conceals the lower member 17. This will insure that the finish of the sides and the two ends of the top will be substantially identical with that found in tops of common construction and will not require that the new top will be different in design or appearance.

The front and rear ends of the top are fitted with carriers into which the side curtains of the vehicle may be folded and concealed. The rear carrier is indicated at 31 in Fig. 3 and it will be seen to be semicircular in shape providing an opening 32 through which the folded curtains may be placed and held in a partially concealed position. The front carrier is indicated at 33 in Fig. 4 and is so designed as to form a curtain compartment in conjunction with the wall portion 17.

In the event that the insulating space 18 is not sufficient to produce the desired insulation of heat it may be found desirable to coat the top portion 16 with a layer of cork 34 as indicated in Fig. 6. This cork may then be concealed by a thin sheet of flexible covering or may be painted over so that it has a sightly appearance. Other materials might also be used such as asbestos and materials of like insulating properties.

The side walls 13 are preferably formed of the same rigid material as the top and are principally designed to carry permanent glass windows 35. These windows may, of course be of any design and arrangement. It will thus be seen that the present invention provides a very sightly vehicle top which may be permanently placed upon the automobile body and which will be less expensive and more durable than the tops now commonly used.

As indicated in the drawings the top is formed of the two walls 16 and 17. It, of course, would be within the spirit of the present invention to eliminate the lower wall 17 and it would be further evident that the top wall might be formed of a single sheet of material pressed into the desired shape.

Having thus described my invention, what I claim and desire to secure by Letters Patent is:

1. A top for a touring car type of body, comprising a transversely arched roof section formed of a thin impervious, semirigid material continuous and unjointed from front to rear and having its longitudinal sides terminating in vertical walls increasing in height from front to rear, whereby to render the same inherently rigid and self-supporting without the aid of stiffening and reinforcing frames, a back wall formed also of the same material united with the roof section and continuing around at its ends for some distance to form comparatively long side walls, and means for connecting said back wall to the body of the car, said back wall and its extended ends forming a support for the forwardly projecting and overhanging rigid roof structure.

2. A top for a touring car type of body comprising a transversely arched roof section formed of two thicknesses of sheet metal joined together around their marginal edges and spaced apart intermediately to form a heat insulating compartment, said roof section having its longitudinal sides terminating in vertical walls increasing in height from front to rear, a back wall formed also of sheet metal united with the roof section and means for connecting said back wall to the body of the car, said roof section being inherently rigid and self-supporting without the aid of the usual stiffening and reinforcing frames, said back wall serving to support the forwardly projecting and overhanging roof structure.

3. A top for a touring car type of body, comprising a transversely arched roof section formed of a thin sheet metal material extending continuously and unjointed from front to rear and provided with longitudinally extending reinforcing ribs, said roof section having its longitudinal sides terminating in vertical walls increasing in height from front to rear, whereby to render the same inherently rigid and self-supporting without the aid of stiffening or reinforcing frames, and a back wall formed also of sheet metal united with the roof section and continuing around at its ends for some distance to form comparatively long side walls, said back wall and its extended ends being adapted to be secured to the body of the car and forming a support for the forwardly projecting, overhanging rigid roof structure.

In testimony whereof I have hereunto set my hand in the presence of two subscribing witnesses.

JAMES C. McQUILKIN.

Witnesses:
JOHN H. HERRING,
W. W. HEALEY.